United States Patent
Chen et al.

(10) Patent No.: US 7,353,569 B2
(45) Date of Patent: Apr. 8, 2008

(54) HINGE ASSEMBLY FOR A FLAT DISPLAY MONITOR

(75) Inventors: Yong-Jian Chen, Shenzhen (CN); An-Kui Hu, Shenzhen (CN); Fan Zhou, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 110 days.

(21) Appl. No.: 11/282,787

(22) Filed: Nov. 18, 2005

(65) Prior Publication Data
US 2006/0126282 A1 Jun. 15, 2006

(30) Foreign Application Priority Data
Dec. 11, 2004 (CN) .................. 2004 2 0102731 U

(51) Int. Cl.
*E05D 11/08* (2006.01)
(52) U.S. Cl. .......................... 16/340; 16/377
(58) Field of Classification Search ................ 16/340, 16/337, 333, 321; 248/580, 584, 917, 922, 248/923; 361/681, 682
See application file for complete search history.

(56) References Cited

U.S. PATENT DOCUMENTS

| | | | |
|---|---|---|---|
| 4,018,104 A * | 4/1977 | Bland et al. | .................. 74/531 |
| 4,829,633 A * | 5/1989 | Kassner | ...................... 16/322 |
| 5,037,231 A | 8/1991 | Kitamura | |
| 5,269,047 A * | 12/1993 | Lu | .............................. 16/340 |
| 6,671,928 B2 | 1/2004 | Huang | |
| 6,698,063 B2 | 3/2004 | Kim et al. | |
| 2002/0083554 A1 | 7/2002 | Lu | |

\* cited by examiner

*Primary Examiner*—Robert J. Sandy
(74) *Attorney, Agent, or Firm*—Jeffrey T. Knapp

(57) ABSTRACT

A hinge assembly (100) for use in a flat display monitor (120) includes a base seat (10), a pivotal shaft (20) and a plurality of washers (30, 40, 50, 60, 70). The base seat includes a first end portion (12) and a second portion (14), which are substantially perpendicular to each other. The first end portion has a retaining hole (122) therein. A protrusion (124) of the first end portion extends into the retaining hole. The pivotal shaft includes a pivotal portion (24). The pivotal portion has at least one flat surface (242) pivotally engaging with the protrusion. The pivotal shaft passes through the retaining hole of the base seat and the plurality of washers, allowing the elements of the hinge assembly to be fastened together.

10 Claims, 5 Drawing Sheets

HINGE ASSEMBLY FOR A FLAT DISPLAY MONITOR

BACKGROUND OF THE INVENTION

1. Field of the Invention

The present invention generally relates to a hinge assembly and, particularly, to a hinge assembly for a flat display monitor.

2. Discussion of the Related Art

With the widespread use and variety of computers, monitors, configured for use with such computers, also are available in a variety of structures. In general, a typical cathode-ray tube (CRT) monitor includes a display panel for displaying an image, a funnel coupled to the rear of the display panel, and an electron gun coupled to the rear of the funnel. This configuration becomes one of the disadvantageous limitations of the CRT Monitor in that the resulting total volume and weight of the CRT monitor are quite large. In addition to the problem mentioned above, the CRT monitor has a further limitation that a user is easily fatigued when watching the CRT monitor for long hours due to its low image quality For at least the problems set above, many people have recently started to use a flat display monitor, e.g., Liquid Crystal Display (LCD) monitor, instead of the conventional CRT monitors. Such flat display monitors generally offer the advantages greatly reduced size and weight characteristics and the ability to produce a high image quality. Further, the flat display monitor may help overcome space limitations through folding (such as with a laptop computer) or rotating (such as with a desktop monitor) so as to facilitate adjustment of the position thereof relative to the user.

The rotating or folding functions of the flat display monitor are realized by a hinge assembly. For example, a hinge assembly is disclosed in U.S. Pat. No. 6,698,063. The hinge assembly includes a shaft, a left and a right mount bracket, two stoppers, and two springs. The shaft is rotatably mounted and extends through the left and the right mount brackets, the two stoppers and the two springs. The left and the right mount brackets, respectively, include a bracket groove, thereby allowing each to engage with the respective stopper for each to limit the inclination angle. After the hinge assembly is used in a long time, however, the spring can be subject to abrasion and, in turn, may abrade other hinge portions. Due to wear of the elements of the hinge elements, the rotating range of the hinge assembly could change over time, also. Further, such a hinge assembly is relatively complicated.

Therefore, a new hinge assembly is desired in order to overcome the above-described shortcomings.

SUMMARY

A hinge assembly for a flat display monitor is provided, which is convenient for a user to operate and which is durable.

In one embodiment thereof, a hinge assembly for use in an flat display monitor includes a base seat, a pivotal shaft, and a plurality of washers. The base seat includes a first end portion and a second portion, which are substantially perpendicular to each other. The first end portion has a retaining hole defined therein and has a protrusion formed at one side of the retaining hole. The pivotal shaft includes a pivotal portion, the pivotal portion having at least one flat surface. At least one flat surface of the pivotal portion engages with the protrusion. The pivotal shaft passes through the retaining hole of the first end portion and through the plurality of washers. The pivotal shaft, the first end portion, and the washers are then fastened together.

Other advantages and novel features will become more apparent from the following detailed description when taken in conjunction with the accompanying drawings.

BRIEF DESCRIPTION OF THE DRAWINGS

Many aspects of the hinge assembly can be better understood with reference to the following drawings. The components in the drawings are not necessarily to scale, the emphasis instead being placed upon clearly illustrating the principles of the hinge assembly. Moreover, in the drawings, like reference numerals designate corresponding parts throughout the several views.

DETAILED DESCRIPTION OF THE EMBODIMENTS

The present invention relates to a hinge assembly suitable for a flat display screen, notebook and so on.

Figure 1:
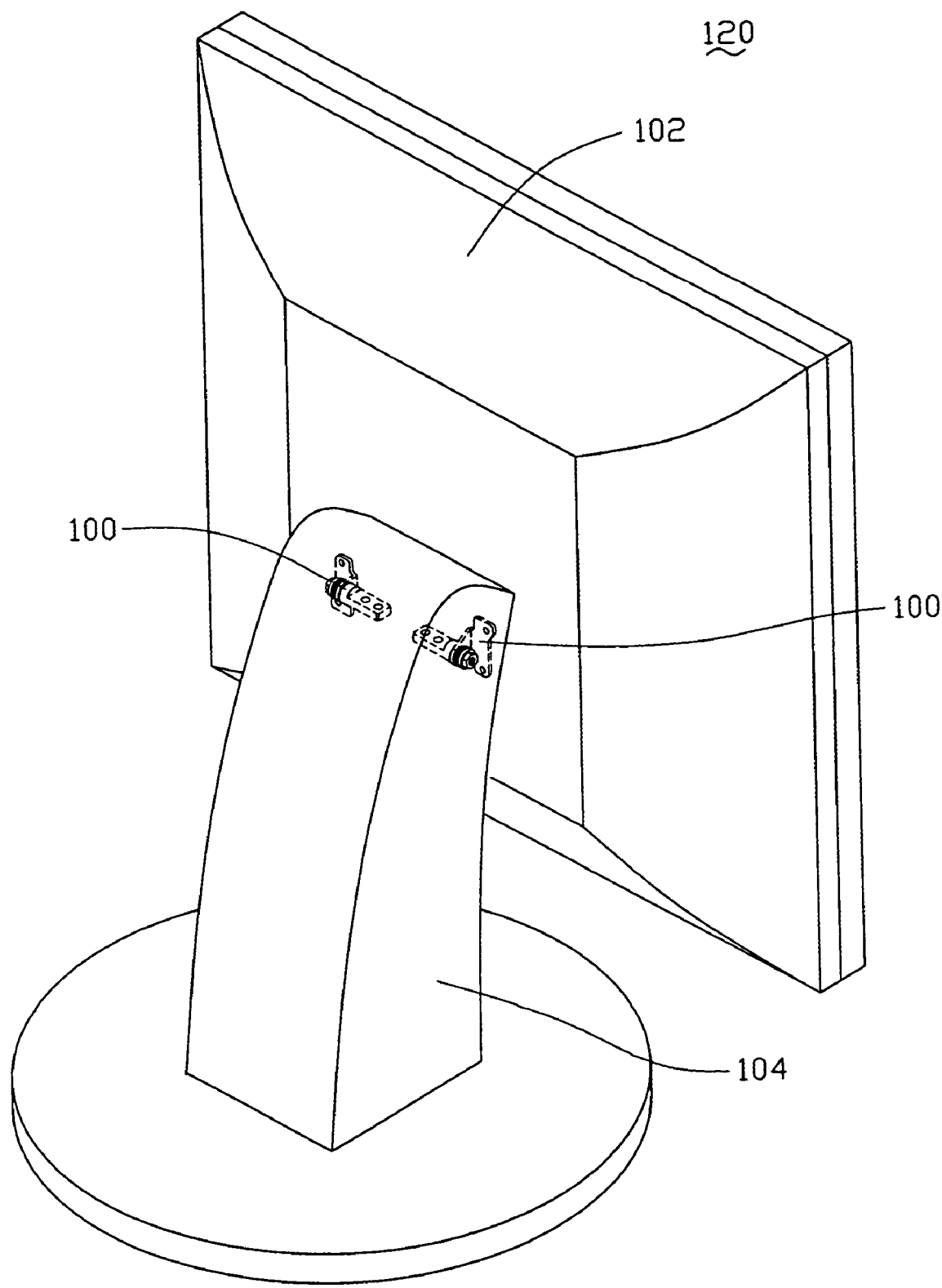
FIG. 1 is an isometric view of an embodiment of a hinge assembly, as used in a flat display screen.

Referring now to the drawings in detail, FIG. 1 shows a hinge assembly 100 for use in a flat display monitor 120. The flat display monitor 120 is taken here as an exemplary application, for the purposes of describing details of a hinge assembly 100 of a preferred embodiment of the present invention. Two identical hinge assemblies 100 are advantageously used in the flat display monitor 120, as shown. However, it is understood any other number of hinge assemblies 100 could be employed and still potentially provide the limited angular movement range desired. The flat display monitor 120 includes a display unit 102 and a main body 104. The hinge assembly 100 connects the display unit 102 to the main body 104 such that the display unit 102 can be rotatably pivoted relative to the main body 104.

Figure 2:
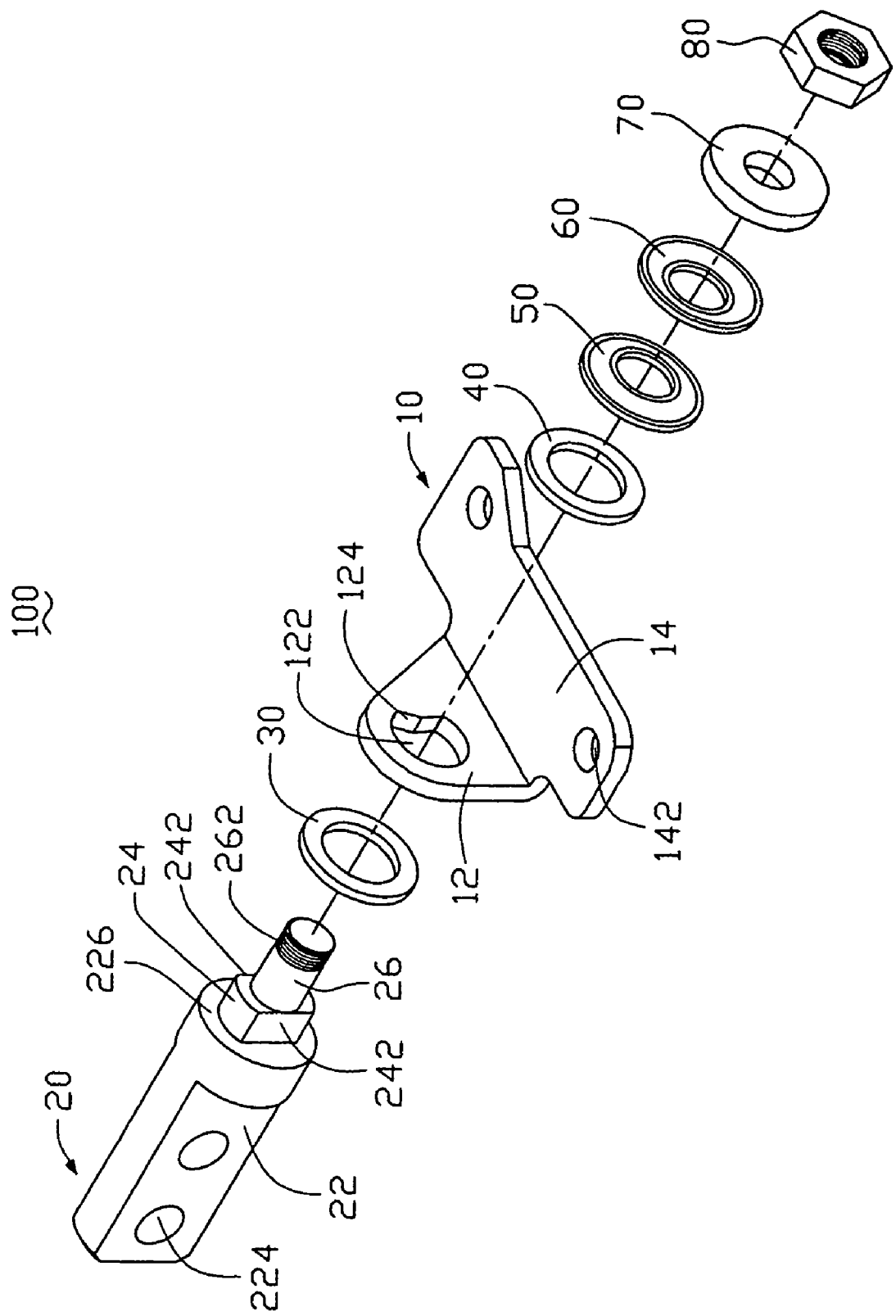
FIG. 2 is an exploded, isometric view of the hinge assembly shown in FIG. 1.

Referring to FIG. 2, the hinge assembly 100 includes a base seat 10, a pivotal shaft 20, two first washers 30, 40, two elastic washers 50, 60, a second washer 70, and a screw nut 80. The pivotal shaft 20 passes through the first washer 30, the base seat 10, the first washer 40, two elastic washers 50, 60, and the second washer 70. The pivot shaft 20 is then fastened in its assembled position with the screw nut 80.

The base seat 10 has a first end portion 12 and a second end portion 14, which is substantially perpendicular to the first end portion 12. The first end portion 12 has a retaining hole 122 defined therein. A protrusion 124 is formed in the first end portion 12 and extends into one side or portion of the retaining hole 122. The protrusion 124 has two symmetrical edges and is substantially <-shaped (i.e., a wide-angle V shape). A protrusion angle 125 (labeled in FIG. 4) associated with the protrusion 124 establishes the pivot angle limits for the hinge assembly 100 and, thus, for the display unit 102. The second portion 14 of the base seat 10 has two fixing holes 142 defined therein. The second portion 14 is mounted onto the display unit 102 by means of the fixing holes 142.

The pivotal shaft 20 includes a fixing portion 22, a pivotal portion 24, and a shaft portion 26 with such parts 22, 24, 26 being sequentially connected and integrally formed. The fixing portion 22 is substantially a cylinder and has two positioning holes 224, thereby facilitating the connection of the fixing portion 22 with the main body 104. The pivotal portion 24 is substantially a truncated cylinder. A diameter of the pivotal portion 24 is smaller than that of the fixing portion 22, thereby forming a step 226. The pivotal portion 24 is formed with two parallel flat surfaces 242 (i.e., the truncated portions of the cylinder) at opposite sides thereof. The shaft portion 26 is a cylinder or, at least, essentially so. A diameter of the shaft portion 26 is smaller than that of the pivotal portion 24, the size and shape of the shaft portion 26 helping ease the insertion thereof through the retaining hole 122 and the washers 40-70. The shaft portion 26 is formed with a thread 262 at a distal end thereof. By the shaft portion 26 being cylindrical, standard-shaped (i.e., circular) washers 40-70 can be used in conjunction therewith. Also, a 360° degree threading at the end thereof is possible, facilitating a stable connection with the screw nut 80.

The first washers 30, 40 are disposed at the two opposite sides of the first end portion 12 to avoid direct contact of the pivotal portion 24 with the first end portion 12 of the base seat 10. The two elastic washers 50, 60 are substantially a horn shape. The two elastic washers 50, 60 are passed through the pivotal shaft 20. The second washer 70 is adjacent to the elastic washer 60. The screw nut 80 is fastened with the thread 262 of the shaft portion 26 of the pivotal shaft 20. The washers 30, 40, 50, 60, 70, as a group, maintain the desired spacing between the various portions of the hinge assembly 100. Furthermore, the washers 30, 40, 50, 60, 70 together help provide an amount of friction that allows movement of the display unit 102 relative to the main body 104 upon application of a moderate force but that, otherwise, helps retain the desired positioning between the main body 104 and the display unit 102. Part of the needed friction can, of course, be expected to be gained through the operation of the other elements of the hinge assembly 100, as well.

Figure 3:
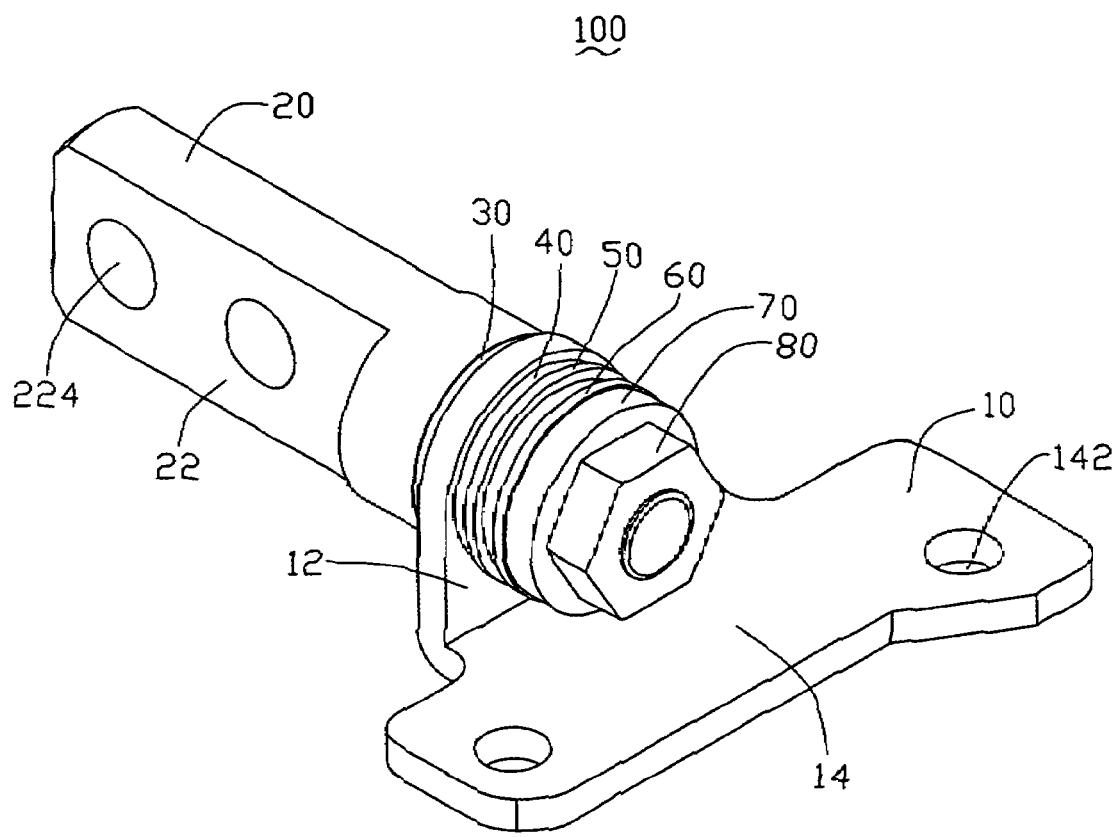
FIG. 3 is an enlarged, assembled, isometric view of the hinge assembly shown in FIG. 2.

In assembly, referring now to FIG. 3, the pivotal shaft 20 is extended through the one first washer 30 and the retaining hole 122 of the first end portion 12 of the base seat 10. The one first washer 30 maintains a separation between the step 226 of the pivotal shaft 20 and the first end portion 12. One of the flat surfaces 242 of the pivotal portion 24 engage with the protrusion 124 of the base seat 10. Then, the other first washer 40 and the elastic washers 50, 60 are placed around the shaft portion 26 of the pivotal shaft 20. The other first washer 40 is engaged with the pivotal portion 24. The elastic washers 50, 60 are opposite the other first washer 40 and each engage around the shaft portion 24. Finally, the screw nut 80 is fixed via the screw thread 262 of the shaft portion 26.

Figure 4:
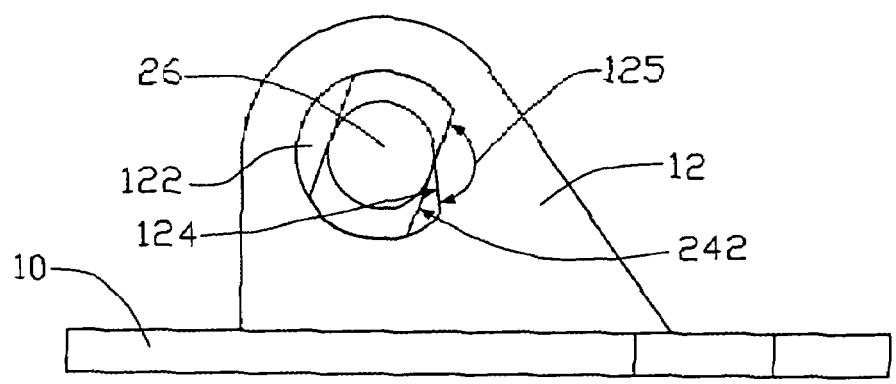
FIG. 4 is a simplified, side view, showing the hinge assembly of FIG. 3 in a first position.
Figure 5:
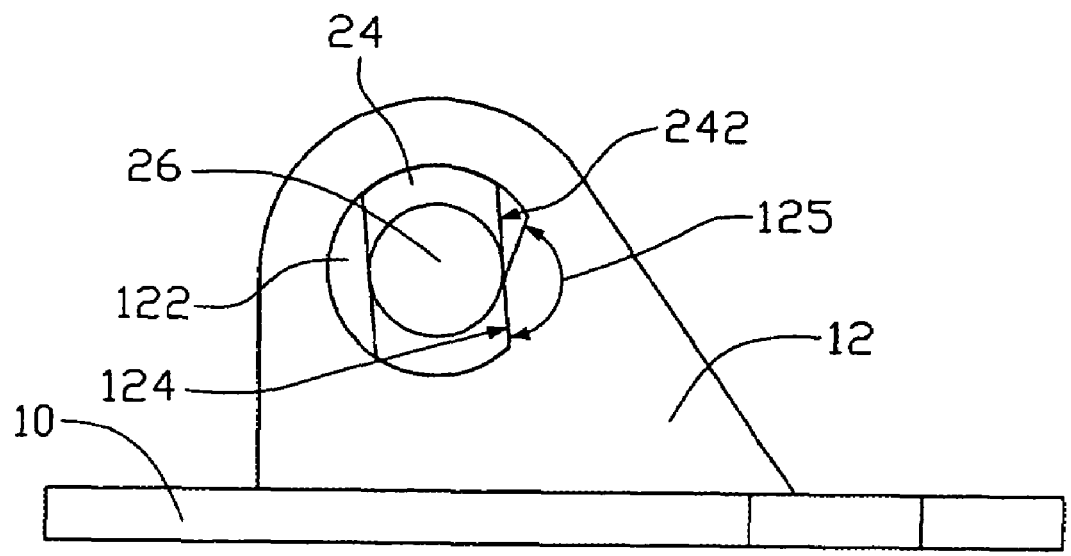
FIG. 5 is similar to FIG. 4, but showing the hinge assembly of FIG. 3 in a second position.

In use, referring to FIGS. 4 and 5, a user exerts a force on the display unit 102, and, in turn, the display unit 102 causes the second end portion 14 of the base seat 10 to likewise move. The protrusion 124 associated with the first end portion 12 will rotate relative to an adjacent flat surface 242 of the pivotal shaft 20. Because the pivotal shaft 20 is operatively fixed in the main body 104 via the fixing portion 22 thereof, the display unit 102 rotates relative to the main body 104. The adjusting degree range is limited by the configuration of the protrusions 124. FIGS. 3 and 4 show two limiting positions. The inclination angle is advantageously about in the range of +5 to −20 degrees.

In alternative embodiments, the pivotal shaft 20 is fastened, e.g., by means of riveting or by a latch pin. In a similar fashion, the screw nut 80 and threaded portion 262 of the shaft portion 26 could, for example, be replaced with a latch pin and receiving hole combination.

As described above, the <-shaped (i.e., angled) protrusion 124 only needs to be disposed one side. One such protrusion 124 is readily manufactured. A precision of rotation range is easily controlled.

Figure 6:
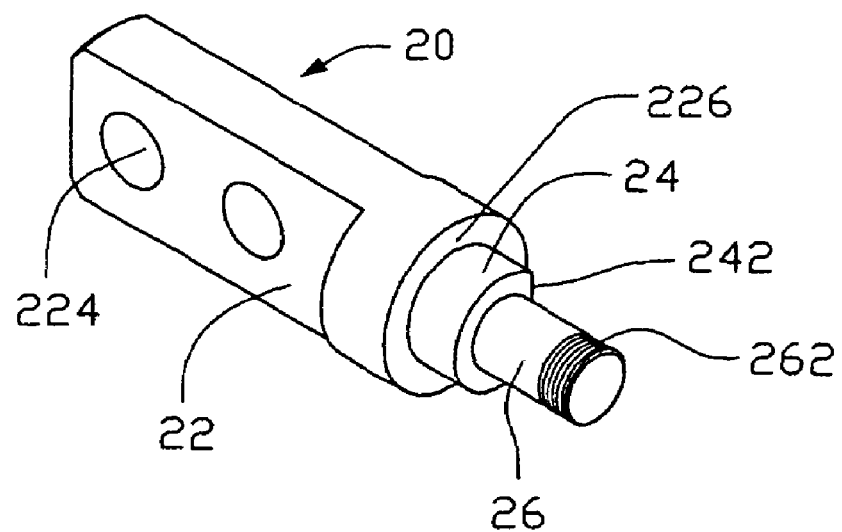
FIG. 6 is an isometric view of a pivotal shaft in accordance with another embodiment.
Figure 7:
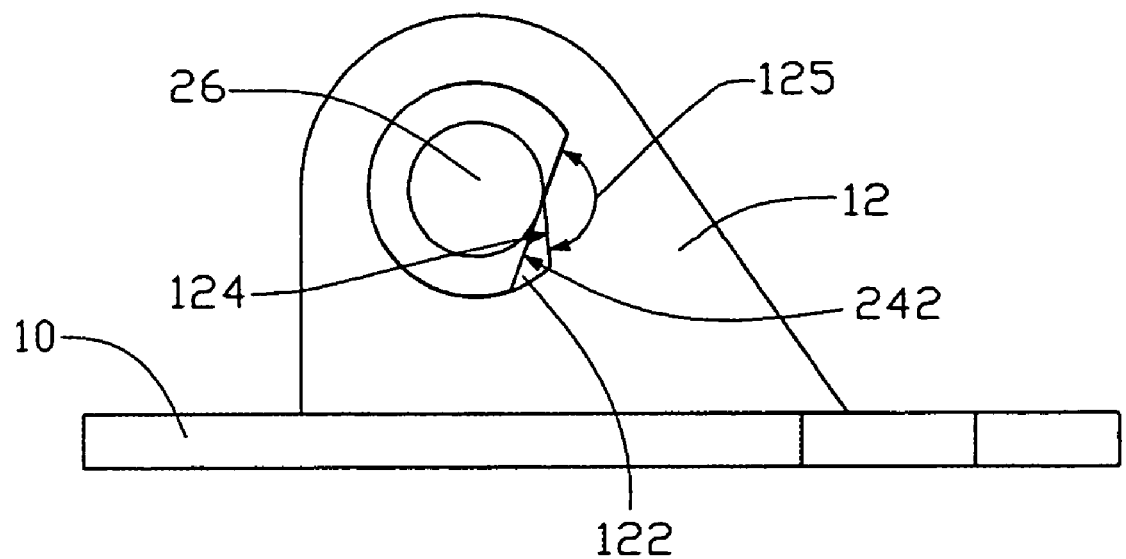
FIG. 7 is a simplified, side view, showing the hinge assembly of FIG. 6 in a first position.
Figure 8:
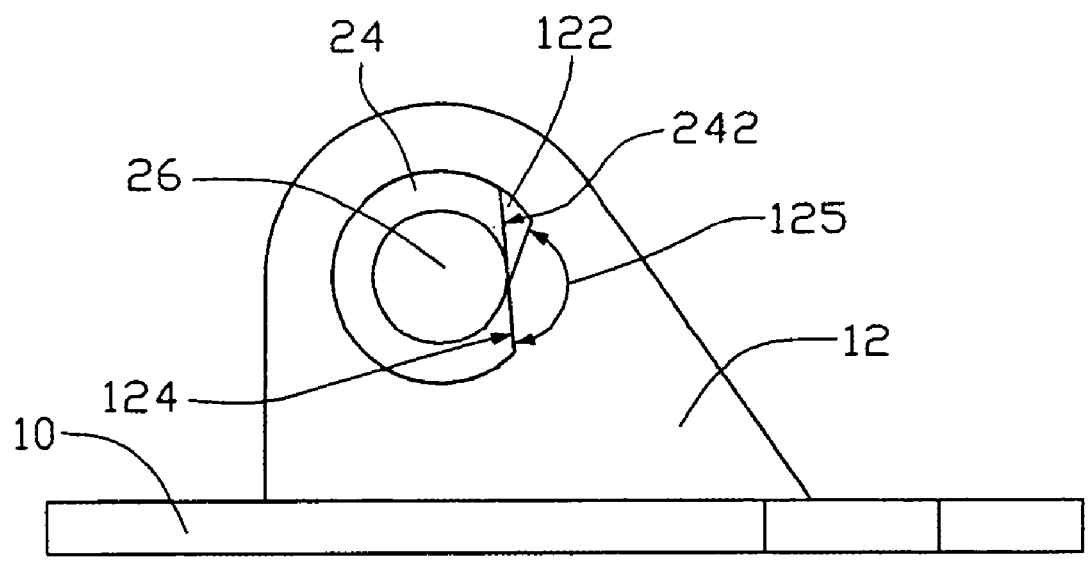
FIG. 8 is similar to FIG. 7, but showing the hinge assembly of FIG. 6 in a second position.

In an alternative embodiment, referring to FIGS. 6, 7, and 8, the two parallel flat surfaces 242 of the pivotal portion 24 may instead be reduced to only one flat surface 242 (FIG. 6), with the remainder of the pivotal portion 24 being cylindrical. Providing only one flat surface 242 should decrease the complexity of the manufacturing procedure and would provide an increased contact area between the pivotal portion 24 and the first end portion 12 and, presumably, a more stable connection therebetween. Also, the increased contact promotes the friction needed for maintaining a chosen position of the main body 104 relative to the display unit 102.

As described above, the preferred embodiments provides a hinge assembly 100 for devices such as a flat display screen, which is convenient for a user to operate and which is durable. It is, however, to be understood that the hinge assembly 100 could potentially be useful in other applications (e.g., a free-standing, adjustable mirror) in which it may be desirable to allow selective pivoting over a limited angular range.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

We claim:

1. A hinge assembly, comprising:
   a base seat, the base seat including a first end portion and a second portion, the first end portion and the second portion being substantially perpendicular to each other, the first end portion having a retaining hole formed therein, the first end portion defining a single protrusion therein, the protrusion extending into one side of the retaining hole;
   a pivotal shaft, the pivotal shaft including a pivotal portion and a cylindrical shaft portion, the pivotal portion having at least one flat surface, the pivotal portion being positioned within the retaining hole of the first end portion, one of the at least one flat surface pivotably engaging with the protrusion; and
   a plurality of washers, wherein
   the cylindrical shaft portion extends beyond the retaining hole of the first end portion, and the first end portion and the plurality of washers are engaged with the cylindrical shaft portion of the pivotal shaft such that the base seat and the washers are fastened together by the pivotal shaft.

2. The hinge assembly as claimed in claim 1, wherein the protrusion is substantially V-shaped.

3. The hinge assembly as claimed in claim 2, wherein the protrusion has two symmetrical edges.

4. The hinge assembly as claimed in claim 1, wherein the pivotal portion has a single flat surface, the flat surface pivotably engaging with the protrusion.

5. The hinge assembly as claimed in claim 1, wherein the pivotal shaft further includes a fixing portion, the fixing portion and the cylindrical shaft portion being respectively disposed at opposing ends of the pivotal portion of the pivotal shaft.

6. The hinge assembly as claimed in claim 5, wherein the fixing portion defines at least one positioning hole.

7. The hinge assembly as claimed in claim 5, wherein the cylindrical shaft portion has a screw thread at a distal end thereof.

8. The hinge assembly as claimed in claim 7, wherein the hinge assembly further comprises a screw nut, the screw nut engaging with the screw thread of the cylindrical shaft portion.

9. A hinge assembly configured for facilitating limited pivotal movement of a first unit relative to a main body, the hinge assembly comprising:

a base seat, the base seat including a first seat portion and a second seat portion, the first seat portion having a retaining hole formed therein, the first seat portion defining a single protrusion therein, the protrusion extending into the retaining hole, the second seat portion being configured for attachment with the first unit; and a pivotal shaft, the pivotal shaft including a pivotal portion, a fixing portion, and a cylindrical shaft portion, the pivotal portion having at least one flat surface, the pivotal portion being operatively positioned within the retaining hole of the first seat portion, one of the at least one flat surface of the pivotal portion pivotably engaging with the protrusion, the fixing portion of the pivotal shaft being configured for being operatively connected to the main body, the cylindrical shaft portion extending beyond the retaining hole of the first seat portion.

10. The hinge assembly as claimed in claim 9, wherein the pivotal portion has a single flat surface, the flat surface pivotably engaging with the protrusion.

* * * * *